(12) United States Patent
Bonasera et al.

(10) Patent No.: US 12,454,276 B2
(45) Date of Patent: Oct. 28, 2025

(54) SYSTEM AND METHOD OF ADAPTIVELY TUNING PARAMETERS IN ACTION PLANNING FOR AUTOMATED DRIVING

(71) Applicant: GM Global Technology Operations LLC, Detroit, MI (US)

(72) Inventors: Stefano Bonasera, Royal Oak, MI (US); Daniel Aguilar Marsillach, Detroit, MI (US); Sayyed Rouhollah Jafari Tafti, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 436 days.

(21) Appl. No.: 18/152,842

(22) Filed: Jan. 11, 2023

(65) Prior Publication Data

US 2024/0227829 A1    Jul. 11, 2024

(51) Int. Cl.
*B60W 50/06* (2006.01)
*B60W 60/00* (2020.01)

(52) U.S. Cl.
CPC ........ *B60W 50/06* (2013.01); *B60W 60/0013* (2020.02); *B60W 60/0015* (2020.02); *B60W 2520/10* (2013.01); *B60W 2520/105* (2013.01); *B60W 2552/05* (2020.02); *B60W 2554/802* (2020.02); *B60W 2555/20* (2020.02); *B60W 2555/60* (2020.02)

(58) Field of Classification Search
None
See application file for complete search history.

(56) References Cited

U.S. PATENT DOCUMENTS

2020/0159225 A1* 5/2020 Zeng .................... G05D 1/0088
2021/0174246 A1* 6/2021 Triplet .................... G06N 7/01
2024/0208533 A1* 6/2024 Cao .................... B60W 60/001

FOREIGN PATENT DOCUMENTS

WO    WO-2021157124 A1 *    8/2021    ............. G06F 17/18

OTHER PUBLICATIONS

Aradi "Survey of Deep Reinforcement Learning for Motion Planning of Autonomous Vehicles" (Year: 2020).*
Machine Translation of WO 2021157124 A1 (Year: 2020).*

* cited by examiner

*Primary Examiner* — Brian P Sweeney
*Assistant Examiner* — David Hatch
(74) *Attorney, Agent, or Firm* — Vivacqua Crane, PLLC

(57) ABSTRACT

A method of adaptively tuning parameters in action planning for automated driving of a vehicle to a destination is provided. The method comprises receiving sensor data from a vehicle sensor, lane data of a road plan to the destination, and a plurality of first hyperparameters in a reinforcement learning agent at an initial state and an initial timestamp. The reinforcement learning agent has a planning policy. The method comprises adjusting the plurality of first hyperparameters via the planning policy having at least one first activation function to define an output defining a plurality of second hyperparameters. The method comprises determining a baseline trajectory action based on a trajectory reward value at a final state and a final timestamp. The method comprises modifying the baseline trajectory action between the initial state and the final state to define a refined trajectory action and controlling the vehicle based on the refined trajectory action.

20 Claims, 2 Drawing Sheets

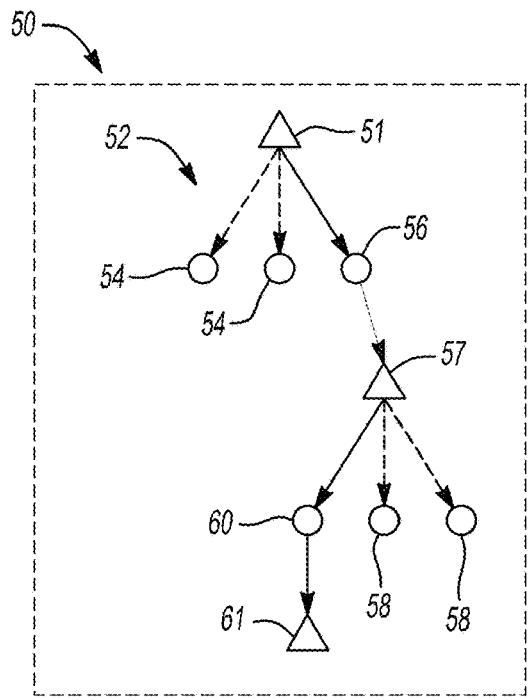
FIG. 3
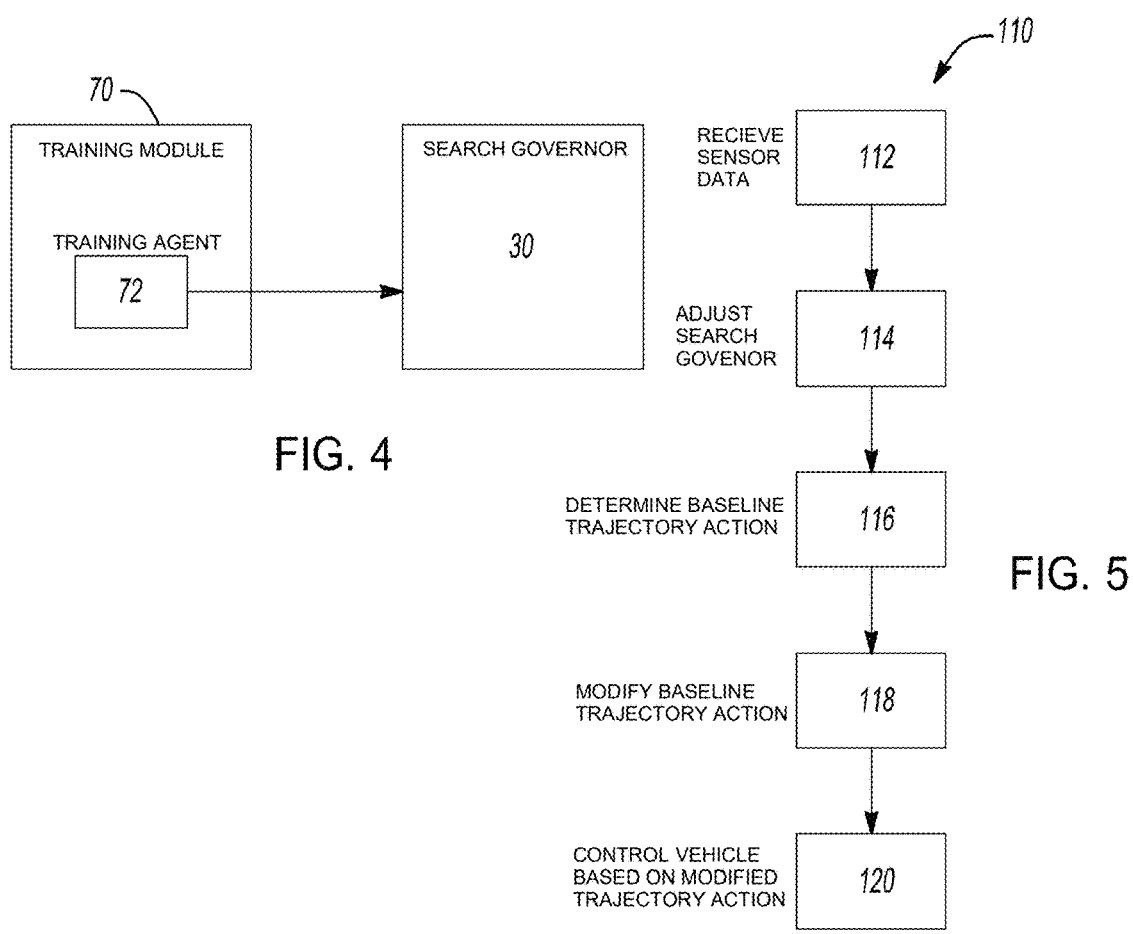
FIG. 4
FIG. 5

SYSTEM AND METHOD OF ADAPTIVELY TUNING PARAMETERS IN ACTION PLANNING FOR AUTOMATED DRIVING

INTRODUCTION

The present disclosure relates to systems and methods of action planning for automated driving of a vehicle and, more particularly, systems and methods of adaptively tuning hyperparameters in action planning for automated driving of a vehicle to a destination.

Current action planning systems for automated driving have challenges with respect to a number of environment conditions and vehicle conditions during operation of a vehicle. Such conditions include congested situations, inclement weather, unmodelled road conditions, and car accidents, to name a few. Current online action planning systems that are governed by a set of engineered hyperparameters may generally experience computational challenges for automated driving in such as disparate scenarios, and may be sub-optimal. As a result, time efficiency may be compromised.

SUMMARY

Thus, while current action planning architectures achieve their intended purpose, there is a need for a new and improved system and method of adaptively tuning hyperparameters in action planning for automated driving of a vehicle to a destination, preventing suboptimal action selection from the planner.

In accordance with one aspect of the present disclosure, a method of adaptively tuning parameters in action planning for automated driving of a vehicle to a destination is provided. The method comprises receiving sensor data from a variety of sensors onboard the vehicle, lane or map data, a road (high-level) plan to the destination, and a plurality of first hyperparameters, leveraged by a reinforcement learning agent. The reinforcement learning agent has a planning policy to adaptively optimize the plurality of first hyperparameters.

In this aspect, the planning policy may be modeled as a neural network (discussed in greater detail below) and may be composed of at least one hidden layer. At each layer, the network may be composed of at least one neuron or node. Each neuron receives an input and generates an output.

The method further comprises adjusting the plurality of first hyperparameters based on the received input, corresponding to sensor data and the lane data and the high-level via the planning policy having at least one activation function to define an output. The at least one first activation function includes:

$$o = f(W * \text{input} + b)$$

where input includes the sensor data, the lane data, and each first hyperparameter; W is a weight matrix, used to scale each first hyperparameter defining a plurality of scaled hyperparameters; b is a bias array to adjust each scaled hyperparameter; and o is the output of the first activation function defining a plurality of second hyperparameters.

In this aspect, the method further comprises determining a baseline trajectory action based on the plurality of second hyperparameters, the sensor data, the lane data, and a trajectory reward value at a final state and a final timestamp. The trajectory reward value includes:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value.

Further, the method comprises modifying the baseline trajectory action based on the plurality of second hyperparameters, the sensor data, and the lane data between the initial state and the final state to define a refined trajectory action, and controlling the vehicle based on the refined trajectory action with respect to the sensor data and lane data to automatedly drive the vehicle to the destination.

In one example, the method further comprises receiving training environmental data, training road plan data, and a plurality of initial hyperparameters in a training agent. The training agent is arranged to iteratively adjust an initial policy for adaptively tuning the plurality of initial hyperparameters. The initial policy has at least one training activation function to define a training output. The at least one training activation function includes:

$$o_t = f_t(W_t \times \text{input}_t + b_t)$$

where input includes the training environmental data, the training road plan data, and each initial hyperparameter; $W_t$ is a training weight matrix to scale each initial hyperparameter defining a plurality of scaled initial hyperparameters; $b_t$ is a training bias array to adjust each scaled initial hyperparameter; and $o_t$ is the training output of the training neural network.

In this example, the method comprises adjusting the plurality of initial hyperparameters by way of the at least one training activation function of the initial policy to define a plurality of hyperparameters. The method further comprises determining a training trajectory action based on the plurality of training hyperparameters and the trajectory reward value. The trajectory reward value includes $$r_t = \alpha_1 \times r_{search}$$

where $r_{search}$ is the default reward value based on one of the safety function, the comfort function, and the compliance function with predetermined road rules, $\alpha_1$ is the first calibration parameter based on the first driving mode, and $r_t$ is the trajectory reward value.

Further to this example, the method comprises modifying the at least one training activation function of the initial policy based on the training trajectory action and a reward design value being:

$$r = \alpha_1 r_{search} + \alpha_2 r_{efficiency}$$

where $\alpha_2$ is a second calibration parameter based on a second driving mode, $r_{efficiency}$ is an efficiency reward value based on computational cost of change in the plurality of initial hyperparameters and based on computational cost of a search of the action trajectory, and r is the reward design value of the at least one training activation function to define at least one updated activation function.

Moreover, the method further comprises iteratively adjusting the plurality of training hyperparameters by way of the at least one updated activation function of the initial policy, and iteratively determining an updated trajectory action based on the plurality of training hyperparameters, the at least one updated activation function, and the trajectory reward value.

In this example, the method further comprises iteratively modifying the at least one updated activation function based on the updated trajectory action and the reward design value, and deploying the initial policy, modelling the reinforcement learning agent when a cumulative reward design value of the at least one updated activation function is iteratively maximized to define the first hyperparameters and the first activation function of the planning policy of the search governor.

In another example of this aspect, the efficiency reward value is based on computational cost of change in the plurality of initial hyperparameters represented by:

$$r_{efficiency} = -(\beta_1 r_{compute} + \beta_2 r_{param\_change})$$

where $r_{compute}$ is a value of time duration of computation, $r_{param\_change}$ is a value of driving impact due to parameter changes, $\beta_1$ is a first calibration parameter, and $\beta_2$ is a second calibration parameter.

In another example, each of the first hyperparameters and the second hyperparameters includes one of number of states, number of timestamps, timestamp size, and type of state. In yet another example, the sensor data includes environment data, object data, weather data, landscape data, and road condition data about the vehicle.

In yet another example of this aspect, the safety function comprises distances between objects about the vehicle, distances to objects from the vehicle. Moreover, the comfort function comprises acceleration, vehicle speed, road condition, road type. Additionally, the compliance function comprises traffic flow, traffic signals, traffic signs, and speed limit.

In still another example, determining the baseline trajectory action comprises determining a first action based on the second hyperparameters, the sensor data, the lane data, and the trajectory reward value at a first state and a first timestamp. In addition, determining the baseline trajectory action comprises determining a second action based on the second hyperparameters, the sensor data, the lane data, and the trajectory reward value at a second state and a second timestamp.

In one example, adjusting the plurality of first hyperparameters is performed at a predetermined time frequency relative to the initial timestamp. For example, the predetermined time frequency is between 50 milliseconds and 5 seconds.

In accordance with another aspect of the present disclosure, a system for adaptively tuning parameters in action planning for automated driving of a vehicle to a destination of an environment is provided. The system comprises at least one sensor disposed on the vehicle and arranged to sense the environment defining sensor data and a processing unit disposed in the vehicle and an in communication with the at least one sensor.

In this aspect, the processing unit comprises a scene module arranged to receive the sensor data from the at least one sensor and a route module arranged to comprise lane data of a road plan to the destination. The processing unit further comprises a search governor being a reinforcement learning agent in communication with the scene module and the route module. The search governor is arranged to comprise a plurality of first hyperparameters at an initial state and an initial timestamp. The reinforcement learning agent has a planning policy to adaptively optimize the plurality of first hyperparameters. The search governor is arranged to adjust the plurality of first hyperparameters based on the sensor data and the lane data via the planning policy.

The planning policy has at least one first activation function to define an output, the at least one first activation function includes:

$$o = f(W * \text{input} + b)$$

where input includes the sensor data, the lane data, and each first hyperparameter; W is a weight to scale each first hyperparameter defining a plurality of scaled hyperparameters; b is a bias to adjust each scaled hyperparameter; and o is the output of the first activation function defining a plurality of second hyperparameters.

In this aspect, the processing unit further comprises a behavior module in communication with the search governor and arranged to determine a baseline trajectory action based on the plurality of second hyperparameters, the sensor data, the lane data, and a trajectory reward value at a final state and a final timestamp. The trajectory reward value includes:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value.

Moreover, the processing unit comprises a trajectory module in communication with the behavior module. The trajectory module is arranged to modify the baseline trajectory action based on the plurality of second hyperparameters, the sensor data, and the lane data between the initial state and the final state to define a refined trajectory action.

The system further comprises a vehicle control unit in communication with the processor unit. The vehicle control unit is arranged control the vehicle based on the refined trajectory action with respect to the sensor data and lane data to automatedly drive the vehicle to the destination.

In one embodiment, the system further comprises a training framework or module having a training agent and in communication with the search governor during deployment. The training module is arranged to receive training environmental data, training road plan data, and a plurality of initial hyperparameters in the training agent. The training agent is arranged to iteratively adjust an initial policy for adaptively tuning the plurality of initial hyperparameters. The initial policy has at least one training activation function to define a training output.

The at least one training activation function includes:

$$o_t = f_t(W_t \times \text{input}_t + b_t)$$

where $\text{input}_t$ includes the training environmental data, the training road plan data, and each initial hyperparameter; $W_t$ is a weight to scale each initial hyperparameter defining a plurality of scaled initial hyperparameters; $b_t$ is a bias to adjust each scaled initial hyperparameter; and $o_t$ is the training output of the training activation function.

In this embodiment, the training agent is further arranged to adjust the plurality of initial hyperparameters by way of the at least one training activation function of the initial policy to define a plurality of training hyperparameters. The training agent is further arranged to determine a training trajectory action based on the plurality of training hyperparameters and the trajectory reward value. The trajectory reward value includes:

$$r_t = \alpha_1 \times r_{search}$$

where $r_{search}$ is the default reward value based on one of the safety function, the comfort function, and the compliance function with predetermined road rules, $\alpha_1$ is the first calibration parameter based on the first driving mode, and $r_t$ is the trajectory reward value.

In this embodiment, the training agent is further arranged to modify the at least one training activation function of the initial policy based on the training trajectory action and a reward design value being:

$$r = \alpha_1 r_{search} + \alpha_2 r_{efficiency}$$

where $\alpha_2$ is a second calibration parameter based on a second driving mode, $r_{efficiency}$ is an efficiency reward value based on computational cost of change in the plurality of initial hyperparameters, and r is the reward design value of the at least one training activation function to define at least one updated activation function.

Moreover, the training agent is further arranged to iteratively adjust the plurality of training hyperparameters by way of the at least one updated activation function of the initial policy. Additionally, the training agent is arranged to iteratively determine an updated trajectory action based on the plurality of training hyperparameters, the at least one updated activation function, and the trajectory reward value.

Further to this embodiment, the training agent is further arranged to iteratively modify the at least one updated activation function based on the updated trajectory action and the reward design value of the at least one updated activation function. Furthermore, the training agent is further arranged to deploy the initial policy in the reinforcement learning agent when the reward design value of the at least one updated activation function is iteratively maximized to define the first hyperparameters and the first activation function of the planning policy.

In another embodiment, the efficiency reward value is based on computational cost of change in the plurality of initial hyperparameters represented by:

$$r_{efficiency} = -(\beta_1 r_{compute} + \beta_2 r_{param\_change})$$

where $r_{compute}$ is a value of time duration of computation, $r_{param\_change}$ is a value of driving impact due to parameter changes, $\beta_1$ is a first calibration parameter, and $\beta_2$ is a second calibration parameter.

In yet another embodiment, each of the first hyperparameters and the second hyperparameters includes one of a number of states used for an online search, a number of timestamps sampling, a timestamp size, and a type of state or selection criteria for a state and action. In another embodiment, the sensor data includes environment data, object data, weather data, landscape data, and road condition data about the vehicle.

In still another embodiment, the safety function comprises distances between objects about the vehicle, distances to objects from the vehicle. Moreover, the comfort function comprises acceleration, vehicle speed, road condition, road type. Furthermore, the compliance function comprises traffic flow, traffic signals, traffic signs, and speed limit.

In another embodiment, determining the baseline trajectory action comprises determining a first action based on the second hyperparameters, the sensor data, the lane data, and the trajectory reward value at a first state and a first timestamp. Moreover, determining the baseline trajectory action comprises determining a second action based on the second hyperparameters, the sensor data, the lane data, and the trajectory reward value at a second state and a second timestamp.

In still another embodiment, adjusting the plurality of first hyperparameters is performed at a predetermined time frequency relative to the initial timestamp. For example, the predetermined time frequency is between 50 milliseconds and 5 seconds.

In accordance with yet another aspect of the present disclosure, a method of adaptively tuning parameters in action planning for automated driving of a vehicle to a destination is provided. The method comprises receiving sensor data from a sensor of the vehicle, lane data of a road plan to the destination, and a plurality of first hyperparameters in a reinforcement learning agent at an initial state and an initial timestamp. The reinforcement learning agent has a planning policy to adaptively optimize the plurality of first hyperparameters.

The method further comprises adjusting the plurality of first hyperparameters at a predetermined time frequency relative to the initial timestamp based on the sensor data and the lane data via the planning policy having at least one first activation function to define an output. The at least one first activation function includes:

$$o = f(W * \text{input} + b)$$

where input includes the sensor data, the lane data, and each first hyperparameter; W is a weight to scale each first hyperparameter defining a plurality of scaled hyperparameters; b is a bias to adjust each scaled hyperparameter; and o is the output of the first activation function defining a plurality of second hyperparameters.

In this aspect, the method further comprises determining a baseline trajectory action based on the plurality of second hyperparameters, the sensor data, the lane data, and a trajectory reward value at a final state and a final timestamp. The trajectory reward value includes:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value.

Further, the method comprises modifying the baseline trajectory action based on the plurality of second hyperparameters, the sensor data, and the lane data between the initial state and the final state to define a refined trajectory action, and controlling the vehicle based on the refined trajectory action with respect to the sensor data and lane data to automatedly drive the vehicle to the destination.

In one example of this aspect, the predetermined time frequency is between 50 milliseconds and 5 seconds.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a conceptual view of a trajectory action plan for a behavior module of the system in FIG. 1.

FIG. 4 is schematic view of a training module having a training agent to be deployed in the search governor of the system in FIG. 1.

FIG. 5 is a method of adaptively tuning parameters in action planning for automated driving of a vehicle to a destination of an environment in accordance with one example of the present disclosure.

DETAILED DESCRIPTION

The following description is merely exemplary in nature and is not intended to limit the present disclosure, application, or uses.

Embodiments and examples of the present disclosure are systems and methods for adaptively tuning hyperparameters in action planning for automated driving of a vehicle. The systems and methods are able to tune such parameters during operation of a vehicle. As a result, computational time is saved and efficiency is enhanced.

Figure 1:
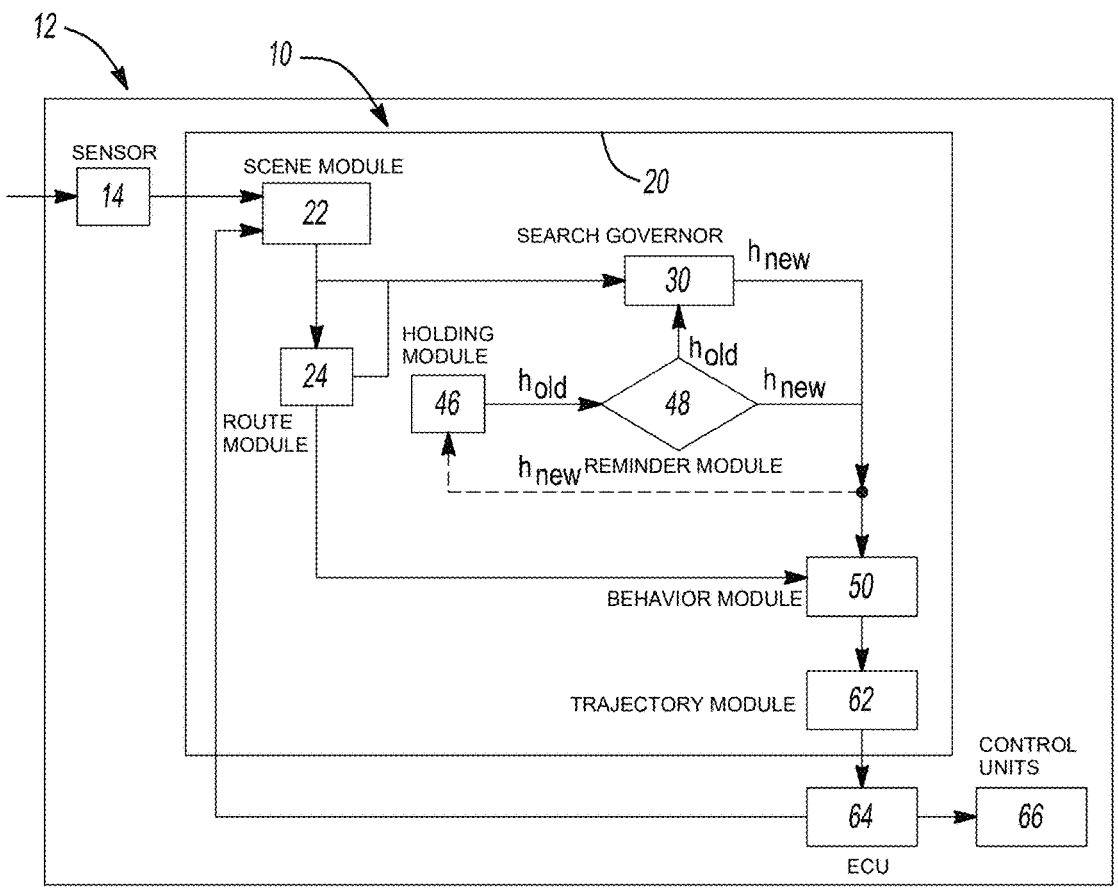
FIG. 1 is a schematic view of a system for adaptively tuning parameters in action planning for automated driving of a vehicle to a destination of an environment in accordance with one embodiment of the present disclosure.

FIG. 1 illustrates a system 10 for adaptively tuning parameters in action planning for automated driving of a vehicle 12 to a destination in an environment according to one embodiment of the present disclosure. As shown, the system 10 comprises at least one sensor 14 (preferably a plurality of sensors) disposed on the vehicle 12. Each sensor 14 is arranged to sense the environment around the vehicle 12 defining sensor data. Moreover, each sensor 14 is arranged to transmit the sensor data. It is to be understood that the at least one sensor 14 may include a camera, a motion sensor, a temperature sensor, or any other suitable sensing device without departing from the spirit or scope of the present disclosure. Moreover, the sensor data may include environment data, object data, weather data, landscape data, road condition data, or any other suitable data about the vehicle without departing from the spirit or scope of the present disclosure.

Referring to FIG. 1, the system 10 further comprises a processing unit 20 disposed in the vehicle 12 and arranged to be in communication with each sensor 14 of the vehicle 12. In this embodiment, the processing unit 20 comprises a scene module 22 arranged to receive and process the sensor data from the at least one sensor 14. The scene module 22 then generates an environmental view around the vehicle, e.g., other vehicles, road signs, objects, weather, road condition, and road type. It is to be understood that the scene module 22 may implement algorithms, algorithmic models, and algorithmic functions to assist in processing the sensor data.

As shown in FIG. 1, the system 10 further comprises a route module 24 arranged to process the environmental view and generate lane data (or high-level road data) of a road plan to the destination. The lane data provides a lane-level plan (e.g. a nominal path) to reach the destination. As an example, the lane data may include a route plan that the vehicle may follow to reach the destination with details regarding road lanes, traffic signs and signals, other vehicles and objects, weather and road conditions. In this embodiment, one of the scene module 22 and the route module 24 may include a map database for generating the environment view and the road plan, respectively. Alternatively, a cloud server (not shown) may include a map database accessible by the scene module 22 and the route module 24. It is to be understood that the route module 24 may implement algorithms, algorithmic models, and algorithmic functions to assist in processing the environmental view and generating lane data of the road plan to the destination.

The processing unit 20 further comprises a search governor 30 in communication with the scene module 22 and the route module 24. The search governor 30, preferably a reinforcement learning (RL) agent (discussed below), is arranged to comprise a plurality of first hyperparameters at an initial state (i.e., a current situation of the RL agent in the environment) and an initial timestamp. The search governor 30 has a planning policy (a trained model to map state to actions of an agent) to adaptively optimize the plurality of first hyperparameters. Each of the first hyperparameters may include a number of parameters of the online search method (e.g., depth and width of the tree), a number of timestamps, a timestamp size, the state selection mechanism used in the online search, or any other suitable parameter for the planning policy to process without departing from the spirit or scope of the present disclosure.

In this embodiment, the search governor 30 is arranged to adjust the plurality of first hyperparameters at a predetermined time frequency relative to the initial timestamp based on the sensor data and the lane data via the planning policy.

Moreover, the planning policy implements at least one first activation function, preferably a plurality of first activation functions, to define an output. Preferably, the at least one first activation function includes:

$$o = f(W * \text{input} + b)$$

where input includes the sensor data, the lane data, and each first hyperparameter; W is a weight to scale each first hyperparameter defining a plurality of scaled hyperparameters; b is a bias to adjust each scaled hyperparameter; and o is the output of the first activation function defining a plurality of second hyperparameters.

It is to be understood that the activation functions discussed in the system 10 may be expressed with varying formulas, e.g. softmax, ReLU, Sigmoid, or Arctan, without departing from the scope or spirit of the present disclosure.

In one example, the search governor 30 may be an artificial neural network, such as a convolutional neural network (CNN), using machine learning (ML) techniques to adjust its weights and biases. Preferably, the search governor 30 is training with techniques from reinforcement learning (RL) and is used to adjust the plurality of first hyperparameters. As known, reinforcement learning is a type of machine learning technique that enables an agent to learn in an interactive environment by trial and error using feedback from actions and experiences. Such reinforcement techniques implemented in the search governor 30 may include policy-based methods, proximal policy optimization (PPO), policy gradient, value-based methods, Q-learning, state-action-reward-state-action (SARSA), deep Q neural network (DQN), or any other suitable RL technique to adjust the first hyperparameters without departing from the spirit or scope of the present disclosure.

Figure 2:
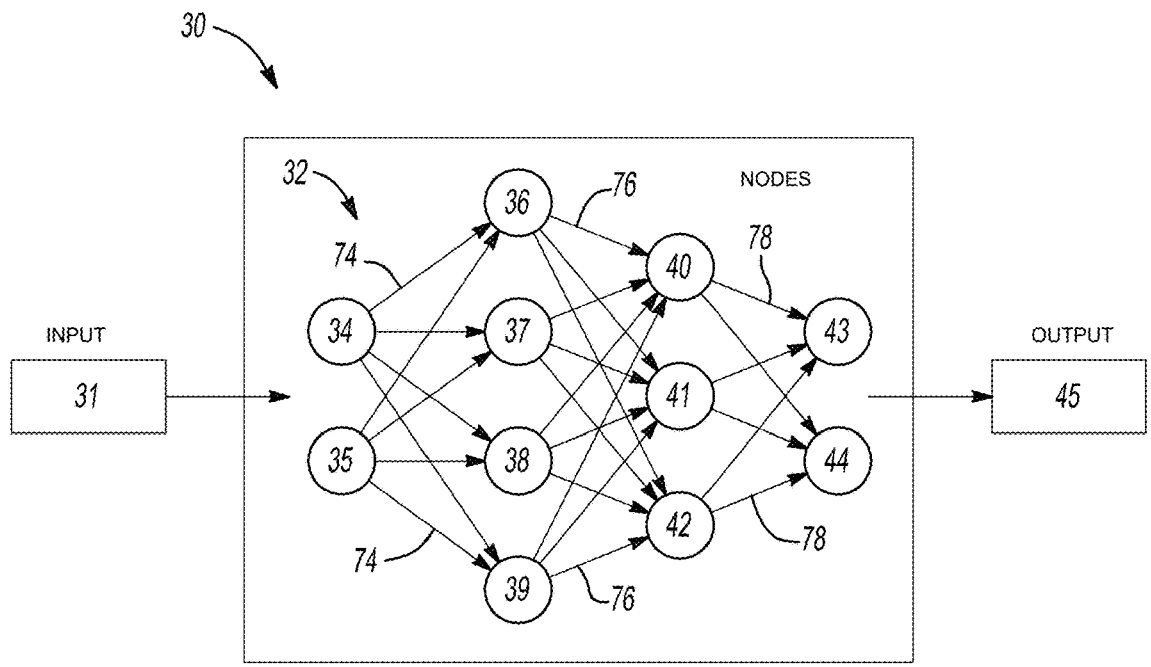
FIG. 2 is a conceptual view of a planning policy of a search governor for the system in FIG. 1.

Referring to an example shown in FIG. 2, the search governor 30 comprises an artificial neural network 32 (such as a CNN) to receive an input 31 and having an input layer of nodes 34-35, a first hidden layer of nodes 36-39, a second hidden layer of node 40-42, and an output layer of nodes 43-44. In this example, the input 31 comprising the sensor data, the lane data, and each first hyperparameter is received by the input layer of nodes 34-35. Each node of each layer comprises one activation function. Each activation function may be one or a set of formulas.

As such, each node 34-35 of the input layer has an $\text{output}_i$ of the respective first activation function and is connected to each node 36-39 of the first hidden layer by way of connections. Moreover, each node 36-39 of the first hidden layer has an $\text{output}_1$ 74 of the respective first activation function and is connected to each node 40-42 of the second hidden layer. Additionally, each node 40-42 of the second hidden layer has an $\text{output}_2$ 76 of the respective first activation function and is connected to each node 43-44 of the output layer. Furthermore, each node 43-44 of the output layer has an $\text{output}_o$ 78, each of which is processed to generate an $\text{output}_{sg}$ 45 of the search governor 30 defining a plurality of second hyperparameters $h_{new}$.

For purposes of computation efficiency, the search governor 30 is arranged to adjust the plurality of first hyperparameters at a predetermined time frequency relative to the initial timestamp as mentioned above. For example, the predetermined time frequency may be between 50 milliseconds and 5 seconds. As shown in FIG. 1, the search governor 30 generates the plurality of second parameters $h_{new}$ which is received in a holding module 46 to replace the plurality of first parameters $h_{old}$. As depicted, a reminder module 48 receives the first parameters $h_{old}$ and determines whether the predetermined time frequency is achieved relative to the initial timestamp. If the predetermined time frequency is achieved, then the search governor 30 adjusts the hyperparameters as discussed above to generate a plurality of second hyperparameters $h_{new}$. It is to be understood that the reminder module 48 may implement algorithms, algorithmic models, and algorithmic functions to assist in determining whether the predetermined time frequency is achieved relative to the initial timestamp.

Referring back to FIG. 1, the processing unit 20 further comprises a behavior module 50 in communication with the search governor 30 and the route module 24. From an initial state, the behavior module 50 is arranged to determine a baseline trajectory action 52 based on the plurality of second hyperparameters, the sensor data, the lane data, and a trajectory reward value at a final state and a final timestamp. The trajectory reward value includes:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value. In this embodiment, the safety function comprises distances between objects about the vehicle 12, distances to objects from the vehicle 12. Moreover, the comfort function comprises acceleration, vehicle speed, road condition, road type. Moreover, the compliance function comprises traffic flow, traffic signals, traffic signs, and speed limit. Furthermore, it is to be understood that the behavior module 50 may implement algorithms, algorithmic models, and algorithmic functions to assist in determining the baseline trajectory action 52.

Referring to an example depicted in FIG. 3, at an initial state 51, the behavior module 50 determines the baseline trajectory action 52 by way of generating a number of possible actions 54 and determining a first action 56 based on the second hyperparameters, the sensor data, the lane data, and the trajectory reward value at a subsequent first state and first timestamp 57. In this example, the number of possible actions can vary based on the second hyperparameters generated. Further to this example, the behavior module 50 then generates a number of possible actions 58 and determines a second action 60 based on the second hyperparameters, the sensor data, the lane data, and the trajectory reward value at a subsequent second (or final) state and second (or final) timestamp 61. In this example, the number of timestamps and the number of states may vary based on the second hyperparameters generated. Although FIG. 3 depicts merely the initial state $(s_t)$ 51, the first state $(s_{t+1})$ 57, and the second (or final) state $(s_{t+2})$ 61, it is to be understood that the behavior module 50 may iterate through an n number of states $(s_n)$ to determine the baseline trajectory, where n is a predetermined number based on the hyperparameters and policy.

Moreover, the processing unit 20 comprises a trajectory module 62 in communication with the behavior module 50. The trajectory module 62 is arranged to modify the baseline trajectory action 52 based on the plurality of second hyperparameters, the sensor data, and the lane data between the initial state and the final state to define a refined trajectory action. It is to be understood that the trajectory module 62 may implement algorithms, algorithmic models, and algorithmic functions to assist in modifying the baseline trajectory action 52 to define the refined trajectory action.

The system 10 further comprises a vehicle control unit or electronic control unit (ECU) 64 including a processor in communication with the processing unit 20. The vehicle control unit 64 is arranged control the vehicle 12 based on the refined trajectory action with respect to the sensor data and lane data to automatedly drive the vehicle 12 to the destination. That is, the ECU 64 is arranged to control mechanical and electrical units 66 of the vehicle 12, e.g., steering, acceleration, speed, braking, stability. Moreover, the ECU 64 receives a signal indicative of the refined trajectory action from the processing unit 20 and controls the vehicle 12 such that the vehicle navigates and travels in accordance with the refined trajectory action to the destination. Furthermore, the scene module 22 receives the signal indicative of the refined trajectory action from the vehicle control unit 64. It is to be understood that the vehicle control unit 64 may implement algorithms, algorithmic models, and algorithmic functions to assist in controlling the vehicle 12 based on the refined trajectory action.

FIG. 4 depicts the system 10 (in-part) further comprising a training module 70 having a training agent 72 for training/developing the first hyperparameters and the first activation function of the planning policy in the search governor 30. As shown, the training module 70 is in communication with the search governor 30. Prior to operation of the vehicle 12, the training module 70 is arranged to receive training environmental data, road plan data, and a plurality of initial hyperparameters in the training agent 72 for training and simulation purposes to develop the planning policy of the search governor 30. Moreover, it is understood that the training module 70 may be disposed remote from the vehicle 12 or in the vehicle without departing from the scope or spirit of the present disclosure.

The training environmental data may be a simulation of an environmental view around the vehicle 12, e.g., other vehicles, road signs, objects, weather, road condition, and road type. The training road plan data may be a simulation of lane data that provide a lane-level plan (e.g. a nominal path) to reach the destination in simulation. As an example, the lane data may include a route plan that the vehicle 12 may follow in simulation to reach the destination with details regarding road lanes, traffic signs and signals, other vehicles and objects, weather and road conditions. In this embodiment, the training module 70 may include a map database for generating the environment view and the road plan in simulation.

The training agent 72, preferably an RL agent, is arranged to comprise the plurality of initial hyperparameters. Each of the initial hyperparameters may include a number of states, a number of timestamps, a timestamp size, a type of state, or any other suitable parameter.

The training agent 72 comprises an initial policy and is arranged to iteratively adjust the initial policy for adaptively tuning the plurality of initial hyperparameters. The initial policy has at least one training activation function to define a training output. The at least one training activation function includes:

$$o_t = f_t(W_t \times input_t + b_t)$$

where input includes the environmental data, the road plan data, and each initial hyperparameter; $W_t$ is a weight to scale each initial hyperparameter defining a plurality of scaled initial hyperparameters; $b_t$ is a bias to adjust each scaled initial hyperparameter; and $o_t$ is the training output of the training activation function.

In one example, the training agent 72 may be (similar to the example depicted in FIG. 2) an artificial neural network that implements machine learning (ML) techniques using algorithmic models to adjust the initial hyperparameters. Preferably, the training agent 72 may be an RL agent that implements reinforcement learning (discussed above) by way of the policy, and implements algorithms, algorithmic models, and algorithmic functions to assist in adjusting the initial policy and the plurality of initial hyperparameters. That is, the training agent 72 may comprise an artificial neural network or the CNN, similar to the search governor 30, having an input layer of nodes, a first hidden layer of nodes, a second hidden layer of node, and an output layer of nodes (discussed above).

In this embodiment, the training agent 72 is further arranged to adjust the plurality of initial hyperparameters by way of the at least one training activation function of the initial policy to define a plurality of training hyperparameters.

The training agent 72 is further arranged to determine a training trajectory action based on the plurality of training hyperparameters and the trajectory reward value. The trajectory reward value includes:

$$r_t = \alpha_1 \times r_{search}$$

where $r_{search}$ is the default reward value based on one of the safety function, the comfort function, and the compliance function with predetermined road rules, $\alpha_1$ is the first calibration parameter based on the first driving mode, and $r_t$ is the trajectory reward value.

In addition, the training agent 72 is further arranged to modify the at least one training activation function of the initial policy based on the training trajectory action and a reward design value being:

$$r = \alpha_1 r_{search} + \alpha_2 r_{efficiency}$$

where $\alpha_2$ is a second calibration parameter based on a second driving mode, $r_{efficiency}$ is an efficiency reward value based on computational cost of change in the plurality of initial hyperparameters, and r is the reward design value of the at least one training activation function to define at least one updated activation function.

Moreover, the efficiency reward value is based on computational cost of change in the plurality of initial hyperparameters represented by:

$$r_{efficiency} = -(\beta_1 r_{compute} + \beta_2 r_{param\_change})$$

where $r_{compute}$ is a value of time duration of computation, $r_{param\_change}$ is a value of driving impact due to parameter changes, $\beta_1$ is a first calibration parameter, and $\beta_2$ is a second calibration parameter.

It is understood that the training agent 72 may implement algorithms (or algorithmic models and algorithmic functions) to assist in adjusting the initial policy and plurality of initial hyperparameters, determining a training trajectory action, and modifying the at least one training activation function of the initial policy.

Further, the training agent 72 is arranged to iteratively adjust the plurality of training hyperparameters by way of the at least one updated activation function of the initial policy. Additionally, the training agent 72 is arranged to iteratively determine an updated trajectory action based on the plurality of training hyperparameters, the at least one updated activation function, and the trajectory reward value. Further to this embodiment, the training agent 72 is arranged to iteratively modify the at least one updated activation function based on the updated trajectory action and the reward design value of the at least one updated activation function.

By way of algorithms (or algorithmic models and algorithmic functions), it is to be understood that the training agent 72 may be arranged to continuously iteratively adjust the plurality of training hyperparameters, iteratively determine an updated trajectory action, and iteratively modify the at least one updated activation function until a predetermined value of the reward design value is reached or when the reward design value is maximized. That is, the training agent 72 may be arranged to compare reward design values of each iteration until a maximum or constant value is reached by way of algorithms, algorithmic models, and algorithmic functions.

Furthermore, when the reward design value of the at least one updated activation function is iteratively maximized, the training agent 72 is arranged to deploy the initial policy in the search governor 30 to define the first hyperparameters and the first activation function of the planning policy.

FIG. 5 shows a method of adaptively tuning parameters in action planning for automated driving of a vehicle to a destination in accordance with one example of the present disclosure. In this example, the method is implemented by the system 10 in FIG. 1. As shown in FIG. 5, the method comprises in block 112 receiving sensor data from a sensor (e.g., the sensor via the scene module in FIG. 1) of the vehicle, lane data of a road plan to the destination (e.g. from the route module), and a plurality of first hyperparameters in a reinforcement learning agent (e.g., the search governor) at an initial state and an initial timestamp. As discussed above, the lane data provides a lane-level plan (e.g. a nominal path) to reach the destination. As an example, the lane data may include a route plan that the vehicle may follow to reach the destination with details regarding road lanes, traffic signs and signals, other vehicles and objects, weather and road conditions. Moreover, the sensor data includes environment data, object data, weather data, landscape data, and road condition data about the vehicle.

The reinforcement learning agent (e.g. the search governor) is arranged to comprise the plurality of first hyperparameters at an initial state (i.e., a current situation of the RL agent in the environment) and an initial timestamp. Moreover, the reinforcement agent has a planning policy (a trained strategy to map state to actions of an agent) to adaptively optimize the plurality of first hyperparameters. Each of the first hyperparameters may include a number of states, a number of timestamps, a timestamp size, a type of state, or any other suitable parameter for the planning policy to process without departing from the spirit or scope of the present disclosure.

The method further comprises in block 114 adjusting with the search governor the plurality of first hyperparameters based on the sensor data and the lane data via the planning policy having at least one first activation function to define an output. The at least one first activation function includes:

$$o = f(W * \text{input} + b)$$

where input includes the sensor data, the lane data, and each first hyperparameter; W is a weight to scale each first hyperparameter defining a plurality of scaled hyperparameters; b is a bias to adjust each scaled hyperparameter; and o is the output of the first activation function defining a plurality of second hyperparameters.

As discussed above and previously depicted in FIGS. 1-2, the reinforcement learning agent may be an artificial neural network that implements machine learning (ML) techniques using algorithmic models to adjust the first hyperparameters at the predetermined time frequency. Preferably, the reinforcement learning agent may be an RL agent that implements reinforcement learning by way of the planning policy. As known, reinforcement learning is a type of machine learning technique that enables an agent to learn in an interactive environment by trial and error using feedback from actions and experiences. Such reinforcement techniques implemented in the search governor may include policy-based methods, proximal policy optimization (PPO), policy gradient, value-based methods, Q-learning, state-action-reward-state-action (SARSA), deep Q neural network (DQN), or any other suitable ML technique to adjust the first hyperparameters without departing from the spirit or scope of the present disclosure.

In one example, adjusting the plurality of first hyperparameters is performed at a predetermined time frequency relative to the initial timestamp. For example, the predetermined time frequency is between 50 milliseconds and 5 seconds.

In this example, the method further comprises in block 116 determining with the behavior module a baseline trajectory action based on the plurality of second hyperparameters, the sensor data, the lane data, and a trajectory reward value at a final state and a final timestamp. The trajectory reward value includes:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value. In this example, the safety function comprises distances between objects about the vehicle, distances to objects from the vehicle. Moreover, the comfort function comprises acceleration, vehicle speed, road condition, road type. Furthermore, the compliance function comprises traffic flow, traffic signals, traffic signs, and speed limit.

As discussed above and previously shown in FIG. 3, the behavior module determines the baseline trajectory action by way of generating a number of possible actions and determining a first action based on the second hyperparameters, the sensor data, the lane data, and the trajectory reward value at a first state and a first timestamp. In this example, the number of possible actions can vary based on the second hyperparameters generated. Further to this example, the behavior module then generates a number of possible actions and determines a second action based on the second hyperparameters, the sensor data, the lane data, and the trajectory reward value at a second (or final) state and a second (or final) timestamp. In this example, the number of timestamps and the number of states may vary based on the second hyperparameters generated. Although FIG. 3 depicts merely state $s_t$, state $s_{t+1}$, and state $s_{t+2}$, it is to be understood that the behavior module may iterate through an n number of states to determine the baseline trajectory.

Further, the method comprises in block 118 modifying with the trajectory module the baseline trajectory action based on the plurality of second hyperparameters, the sensor data, and the lane data between the initial state and the final state to define a refined trajectory action.

Furthermore, the method comprises in block 120 controlling the vehicle with the vehicle control unit or ECU based on the refined trajectory action with respect to the sensor data and lane data to automatedly drive the vehicle to the destination. As discussed, the ECU is arranged to control mechanical units of the vehicle, e.g., steering, acceleration, speed, braking, stability. Moreover, the ECU receives a signal indicative of the refined trajectory action from the processing unit 20 and controls the vehicle such that the vehicle navigates and travels in accordance with the refined trajectory action to the destination. Furthermore, the scene module receives the signal indicative of the refined trajectory action from the vehicle control unit.

In one example, the method further comprises receiving training environmental data, training road plan data, and a plurality of initial hyperparameters in the training agent of the training module. As discussed above, the training agent is arranged to iteratively adjust an initial policy for adaptively tuning the plurality of initial hyperparameters. The initial policy has at least one training activation function to define a training output. The at least one training activation function includes:

$$o_t = f_t(W_t \times \text{input}_t + b_t)$$

where $\text{input}_t$ includes the training environmental data, the training road plan data, and each initial hyperparameter; $W_t$ is a weight to scale each initial hyperparameter defining a plurality of scaled initial hyperparameters; $b_t$ is a bias to adjust each scaled initial hyperparameter; and $o_t$ is the training output of the training activation function.

In this example, the method comprises adjusting with the training agent the plurality of initial hyperparameters by way of the at least one training activation function of the initial policy to define a plurality of training hyperparameters. The method further comprises determining a training trajectory action based on the plurality of training hyperparameters and the trajectory reward value. The trajectory reward value includes $$r_t = \alpha_1 \times r_{search}$$

where $r_{search}$ is the default reward value based on one of the safety function, the comfort function, and the compliance function with predetermined road rules, $\alpha_1$ is the first calibration parameter based on the first driving mode, and $r_t$ is the trajectory reward value.

Further to this example, the method comprises modifying with the training agent the at least one training activation function of the initial policy based on the training trajectory action and a reward design value being:

$$r = \alpha_1 r_{search} + \alpha_2 r_{efficiency}$$

where $\alpha_2$ is a second calibration parameter based on a second driving mode, $r_{efficiency}$ is an efficiency reward value based on computational cost of change in the plurality of initial hyperparameters, and r is the reward design value of the at least one training activation function to define at least one updated activation function.

In another example of this aspect, the efficiency reward value is based on computational cost of change in the plurality of initial hyperparameters represented by:

$$r_{efficiency} = -(\beta_1 r_{compute} + \beta_2 r_{param\_change})$$

where $r_{compute}$ is a value of time duration of computation, $r_{param\_change}$ is a value of driving impact due to parameter changes, $\beta_1$ is a first calibration parameter, and $\beta_2$ is a second calibration parameter.

Moreover, with the training agent, the method further comprises iteratively adjusting the plurality of training hyperparameters by way of the at least one updated activation function of the initial policy, and iteratively determining an updated trajectory action based on the plurality of training hyperparameters, the at least one updated activation function, and the trajectory reward value. In this example, the method further comprises iteratively modifying the at least one updated activation function based on the updated trajectory action and the reward design value of the at least one updated activation function.

It is to be understood that the training agent may be arranged to continuously iteratively adjust the plurality of training hyperparameters, iteratively determine an updated trajectory action, and iteratively modify the at least one updated activation function until a predetermined value of the reward design value is reached or when the reward design value is maximized. That is, the training agent may be arranged to compare reward design values of each iteration until a maximum or constant value is reached.

Furthermore, when the reward design value of the at least one updated activation function is iteratively maximized, the method comprises deploying the initial policy in the reinforcement learning agent to define the first hyperparameters and the first activation function of the planning policy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of adaptively tuning parameters in action planning for automated driving of a vehicle to a destination, the method comprising:
  receiving sensor data from a sensor of the vehicle, lane data of a road plan to the destination, and a plurality of first hyperparameters in a reinforcement learning agent at an initial state representing a current situation of the reinforcement learning agent and an initial timestamp, the reinforcement learning agent having a planning policy to adaptively optimize the plurality of first hyperparameters;

adjusting the plurality of first hyperparameters based on the sensor data and the lane data via the planning policy having at least one first activation function to define an output, the at least one first activation function including:

$$o = f(W * \text{input} + b)$$

where input includes the sensor data, the lane data, and each first hyperparameter; W is a weight to scale each first hyperparameter defining a plurality of scaled hyperparameters; b is a bias to adjust each scaled hyperparameter; and o is the output of the first activation function defining a plurality of second hyperparameters;

determining a baseline trajectory action based on the plurality of second hyperparameters, the sensor data, the lane data, and a trajectory reward value at a final state representing a subsequent state of the reinforcement learning agent and a final timestamp, the trajectory reward value including:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value;

modifying the baseline trajectory action based on the plurality of second hyperparameters, the sensor data, and the lane data processed by the reinforcement learning agent between the initial state and the final state to define a refined trajectory action; and controlling the vehicle based on the refined trajectory action with respect to the sensor data and lane data to automatedly drive the vehicle to the destination.

2. The method of claim 1 further comprising:

receiving training environmental data, training road plan data, and a plurality of initial hyperparameters in a training agent, the training agent arranged to iteratively adjust an initial policy for adaptively tuning the plurality of initial hyperparameters, the initial policy having at least one training activation function to define a training output, the at least one training activation function including:

$$o_t = f_t(W_t \times \text{input}_t + b_t)$$

where $\text{input}_t$ includes the environmental data, the road plan data, and each initial hyperparameter; $W_t$ is a weight to scale each initial hyperparameter defining a plurality of scaled initial hyperparameters; $b_t$ is a bias to adjust each scaled initial hyperparameter; and $o_t$ is the training output of the training activation function;

adjusting the plurality of initial hyperparameters by way of the at least one training activation function of the initial policy to define a plurality of training hyperparameters;

determining a training trajectory action based on the plurality of training hyperparameters and the trajectory reward value, the trajectory reward value including:

$$r_t = \alpha_1 \times r_{search}$$

where $r_{search}$ is the default reward value based on one of the safety function, the comfort function, and the compliance function with predetermined road rules, $\alpha_1$ is the first calibration parameter based on the first driving mode, and $r_t$ is the trajectory reward value;

modifying the at least one training activation function of the initial policy based on the training trajectory action and a reward design value being:

$$r = \alpha_1 r_{search} + \alpha_2 r_{efficiency}$$

where $\alpha_2$ is a second calibration parameter based on a second driving mode, $r_{efficiency}$ is an efficiency reward value based on computational cost of change in the plurality of initial hyperparameters, and r is the reward design value of the at least one training activation function to define at least one updated activation function;

iteratively adjusting the plurality of training hyperparameters by way of the at least one updated activation function of the initial policy;

iteratively determining an updated trajectory action based on the plurality of training hyperparameters, the at least one updated activation function, and the trajectory reward value;

iteratively modifying the at least one updated activation function based on the updated trajectory action and the reward design value of the at least one updated activation function; and deploying the initial policy in the reinforcement learning agent when the reward design value of the at least one updated activation function is iteratively maximized to define the first hyperparameters and the first activation function of the planning policy.

3. The method of claim 1 wherein the efficiency reward value is based on computational cost of change in the plurality of initial hyperparameters represented by:

$$r_{efficiency} = -(\beta_1 r_{compute} + \beta_2 r_{param\_change})$$

where $r_{compute}$ is a value of time duration of computation, $r_{param\_change}$ is a value of driving impact due to parameter changes, $\delta_1$ is a first calibration parameter, and $\delta_2$ is a second calibration parameter.

4. The method of claim 1 wherein each of the first hyperparameters and the second hyperparameters include one of number of states, number of timestamps, timestamp size, and type of state.

5. The method of claim 1 wherein the sensor data includes environment data, object data, weather data, landscape data, and road condition data about the vehicle.

6. The method of claim 1 wherein the safety function comprises distances between objects about the vehicle, distances to objects from the vehicle, wherein the comfort function comprises acceleration, vehicle speed, road condition, road type, and wherein the compliance function comprises traffic flow, traffic signals, traffic signs, and speed limit.

7. The method of claim 1 wherein determining the baseline trajectory action comprises:
determining a first action based on the second hyperparameters, the sensor data, the lane data, and the trajectory reward value at a first state representing a subsequent state of the reinforcement learning agent and a first timestamp;
determining a second action based on the second hyperparameters, the sensor data, the lane data, and the trajectory reward value at a second state representing a subsequent state of the reinforcement learning agent and a second timestamp.

8. The method of claim 1 wherein adjusting the plurality of first hyperparameters is performed at a predetermined time frequency relative to the initial timestamp.

9. The method of claim 8 wherein the predetermined time frequency is between 50 milliseconds and 5 seconds.

10. A system for adaptively tuning parameters in action planning for automated driving of a vehicle to a destination of an environment, the system comprising:
at least one sensor disposed on the vehicle and arranged to sense the environment defining sensor data a processing unit disposed in the vehicle and an in communication with the at least one sensor, the processing unit comprising:
a scene module arranged to receive the sensor data from the at least one sensor;
a route module arranged to comprise lane data of a road plan to the destination;
a search governor being a reinforcement learning agent in communication with the scene module and the route module, the search governor arranged to comprise a plurality of first hyperparameters at an initial state representing a current situation of the reinforcement learning agent and an initial timestamp, the reinforcement learning agent having a planning policy to adaptively optimize the plurality of first hyperparameters, the search governor arranged to adjust the plurality of first hyperparameters based on the sensor data and the lane data via the planning policy having at least one first activation function to define an output, the at least one activation function including:

$$o = f(W * \text{input} + b)$$

where input includes the sensor data, the lane data, and each first hyperparameter; W is a weight to scale each first hyperparameter defining a plurality of scaled hyperparameters; b is a bias to adjust each scaled hyperparameter; and o is the output of the first activation function defining a plurality of second hyperparameters;
a behavior module in communication with the search governor and arranged to determine a baseline trajectory action based on the plurality of second hyperparameters, the sensor data, the lane data, and a trajectory reward value at a final state representing a subsequent state of the reinforcement learning agent and a final timestamp, the trajectory reward value including:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value; and
a trajectory module in communication with the behavior module and arranged to modify the baseline trajectory action based on the plurality of second hyperparameters, the sensor data, and the lane data processed by the reinforcement learning agent between the initial state and the final state to define a refined trajectory action; and
a vehicle control unit in communication with the processor unit and arranged control the vehicle based on the refined trajectory action with respect to the sensor data and lane data to the destination.

11. The system of claim 10 further comprising:
a training module having a training agent and in communication with the search governor, the training module arranged to receive training environmental data, training road plan data, and a plurality of initial hyperparameters in the training agent, the training agent arranged to iteratively adjust an initial policy for adaptively tuning the plurality of initial hyperparameters, the initial policy having at least one training activation function to define a training output, the at least one training activation function including:

$$o_t = f_t(W_t \times \text{input}_t + b_t)$$

where $\text{input}_t$ includes the training environmental data, the training road plan data, and each initial hyperparameter; $W_t$ is a weight to scale each initial hyperparameter defining a plurality of scaled initial hyperparameters; $b_t$ is a bias to adjust each scaled initial hyperparameter; and $o_t$ is the training output of the training activation function;
the training agent further arranged to adjust the plurality of initial hyperparameters by way of the at least one training activation function of the initial policy to define a plurality of training hyperparameters;
the training agent further arranged to determine a training trajectory action based on the plurality of training hyperparameters and the trajectory reward value, the trajectory reward value including:

$$r_t = \alpha_1 \times r_{search}$$

where $r_{search}$ is the default reward value based on one of the safety function, the comfort function, and the compliance function with predetermined road rules, $\alpha_1$ is the first calibration parameter based on the first driving mode, and $r_t$ is the trajectory reward value;
the training agent further arranged to modify the at least one training activation function of the initial policy based on the training trajectory action and a reward design value being:

$$r = \alpha_1 r_{search} + \alpha_2 r_{efficiency}$$

where $\alpha_2$ is a second calibration parameter based on a second driving mode, $r_{efficiency}$ is an efficiency reward value based on computational cost of change in the plurality of initial hyperparameters, and r is the reward design value of the at least one training activation function to define at least one updated activation function;

the training agent further arranged to iteratively adjust the plurality of training hyperparameters by way of the at least one updated activation function of the initial policy;

the training agent further arranged to iteratively determine an updated trajectory action based on the plurality of training hyperparameters, the at least one updated activation function, and the trajectory reward value;

the training agent further arranged to iteratively modify the at least one updated activation function based on the updated trajectory action and the reward design value of the at least one updated activation function; and the training agent further arranged to deploy the initial policy in the reinforcement learning agent when the reward design value of the at least one updated activation function is iteratively maximized to define the first hyperparameters and the first activation function of the planning policy.

12. The system of claim 11 wherein the efficiency reward value is based on computational cost of change in the plurality of initial hyperparameters represented by:

$$r_{efficiency} = -(\beta_1 r_{compute} + \beta_2 r_{param\_change})$$

where $r_{compute}$ is a value of time duration of computation, $r_{param\_change}$ is a value of driving impact due to parameter changes, $\delta_1$ is a first calibration parameter, and $\delta_2$ is a second calibration parameter.

13. The system of claim 10 wherein each of the first hyperparameters and the second hyperparameters include one of a number of states, a number of timestamps, a timestamp size, and a type of state.

14. The system of claim 10 wherein the sensor data includes environment data, object data, weather data, landscape data, and road condition data about the vehicle.

15. The system of claim 10 wherein the safety function comprises distances between objects about the vehicle, distances to objects from the vehicle, wherein the comfort function comprises acceleration, vehicle speed, road condition, road type, and wherein the compliance function comprises traffic flow, traffic signals, traffic signs, and speed limit.

16. The system of claim 10 wherein determining the baseline trajectory action comprises:
    determining a first action based on the second hyperparameters, the sensor data, the lane data, and the trajectory reward value at a first state representing a subsequent state of the reinforcement learning agent and a first timestamp;
    determining a second action based on the second hyperparameters, the sensor data, the lane data, and the trajectory reward value at a second state representing a subsequent state of the reinforcement learning agent and a second timestamp.

17. The system of claim 10 wherein adjusting the plurality of first hyperparameters is performed at a predetermined time frequency relative to the initial timestamp.

18. The system of claim 17 wherein the predetermined time frequency is between 50 milliseconds and 5 seconds.

19. A method of adaptively tuning parameters in action planning for automated driving of a vehicle to a destination, the method comprising:
    receiving sensor data from a sensor of the vehicle, lane data of a road plan to the destination, and a plurality of first hyperparameters in a reinforcement learning agent at an initial state representing a current situation of the reinforcement learning agent and an initial timestamp, the reinforcement learning agent having a planning policy to adaptively optimize the plurality of first hyperparameters;
    adjusting the plurality of first hyperparameters at a predetermined time frequency relative to the initial timestamp based on the sensor data and the lane data via the planning policy having at least one first activation function to define an output, the at least one activation function including:

$$o = f(W * input + b)$$

where input includes the sensor data, the lane data, and each first hyperparameter; W is a weight to scale each first hyperparameter defining a plurality of scaled hyperparameters; b is a bias to adjust each scaled hyperparameter; and o is the output of the first activation function defining a plurality of second hyperparameters;
    determining a baseline trajectory action based on the plurality of second hyperparameters, the sensor data, the lane data, and a trajectory reward value at a final state representing a subsequent state of the reinforcement learning agent and a final timestamp, the trajectory reward value including:

$$r_t = \alpha_1 \times r_{search}$$

where $r_{search}$ is a default reward value based on one of a safety function, a comfort function, and a compliance function with predetermined road rules, $\alpha_1$ is a first calibration parameter based on a first driving mode, and $r_t$ is the trajectory reward value;
    modifying the baseline trajectory action based on the plurality of second hyperparameters, the sensor data, and the lane data processed by the reinforcement learning agent between the initial state and the final state to define a refined trajectory action; and
    controlling the vehicle based on the refined trajectory action with respect to the sensor data and lane data to the destination.

20. The method of claim 19 wherein the predetermined time frequency is between 50 milliseconds and 5 seconds.

* * * * *